United States Patent [19]
Hutcheon et al.

[11] 4,107,692
[45] Aug. 15, 1978

[54] RADIO FREQUENCY SIGNAL DIRECTION FINDING SYSTEM

[75] Inventors: Robert Stewart Hutcheon, Goleta; Bruce E. Gordon, Santa Barbara, both of Calif.

[73] Assignee: Raytheon Company, Lexington, Mass.

[21] Appl. No.: 776,077

[22] Filed: Mar. 9, 1977

[51] Int. Cl.² .............................................. G01S 3/20
[52] U.S. Cl. .................................... 343/120; 343/754
[58] Field of Search ................................ 343/120, 754

[56] References Cited

U.S. PATENT DOCUMENTS

| | | | |
|---|---|---|---|
| 2,969,541 | 1/1961 | Seaman | 343/120 |
| 3,054,105 | 5/1957 | Steiner et al. | 343/113 DE X |
| 3,121,871 | 2/1962 | Beukers | 343/113 DE X |
| 3,761,936 | 9/1973 | Archer et al. | 343/754 |

Primary Examiner—Nelson Moskowitz
Assistant Examiner—Richard E. Berger
Attorney, Agent, or Firm—Richard M. Sharkansky; Joseph D. Pannone

[57] ABSTRACT

A radio frequency signal direction finding system wherein radio frequency signals received at output ports of a multibeam array antenna are sequentially sampled, in response to a sampling signal, at a frequency $f_s$. The sampled signals are fed to a receiver channel which is tuned to the sampling frequency to produce a composite signal having a frequency $f_s$ and a phase angle, relative to a reference phase angle of the sampling signal, which provides an indication of the relative signal levels received at the output ports and hence an indication of the angular direction of a source of the radio frequency signals.

4 Claims, 19 Drawing Figures

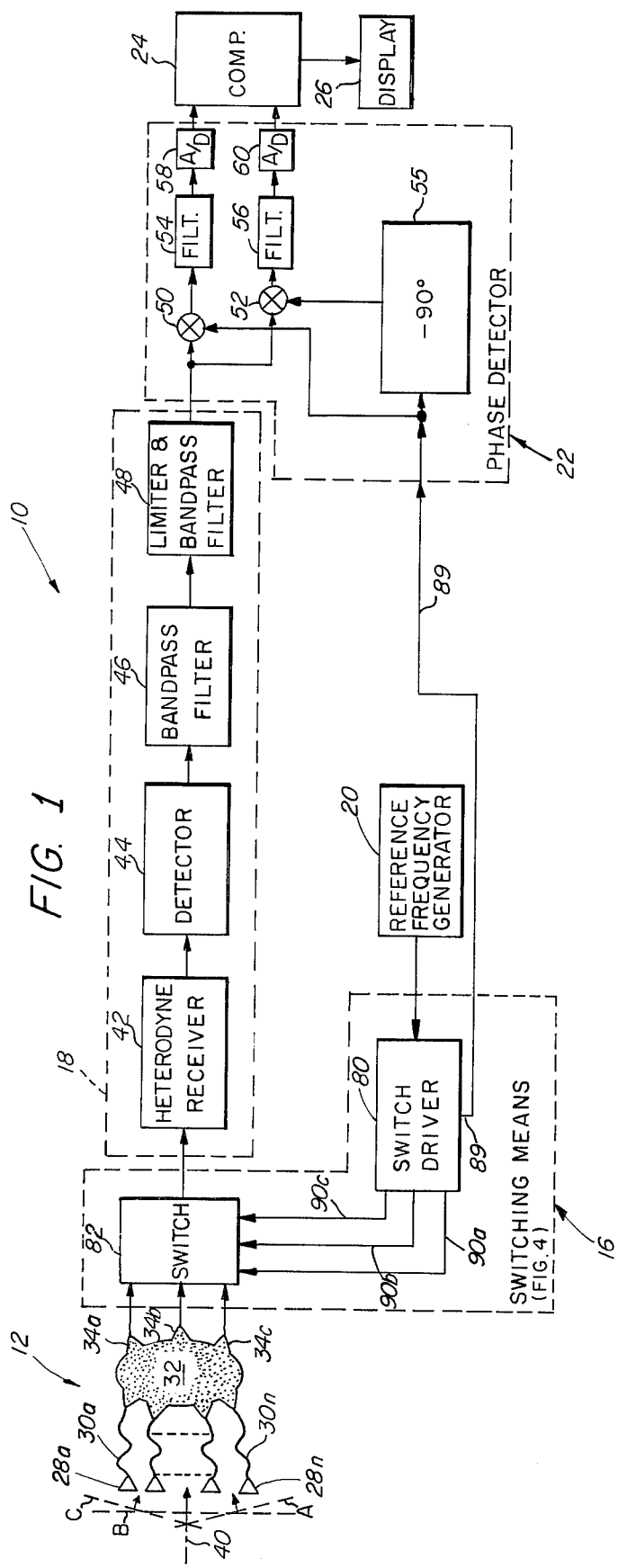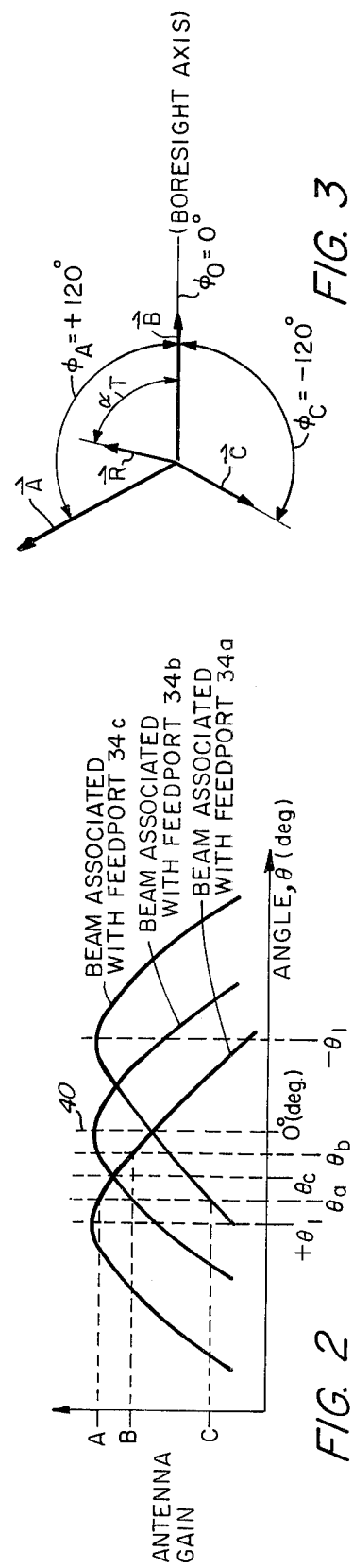

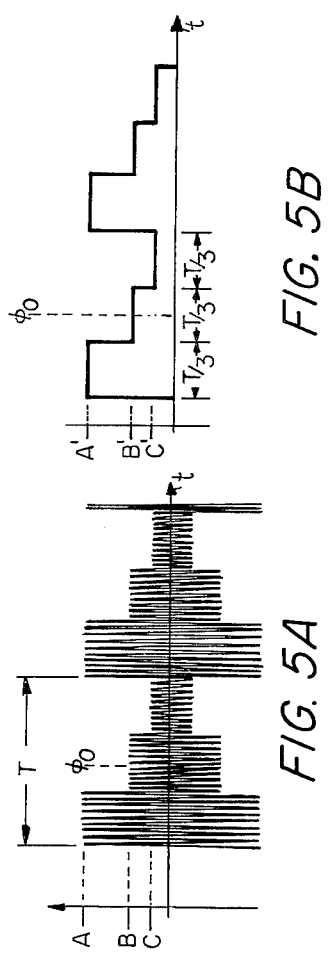
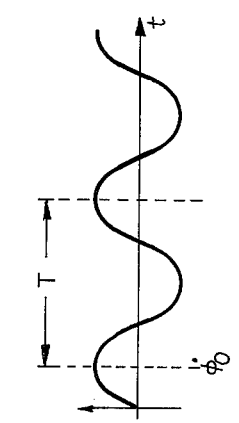
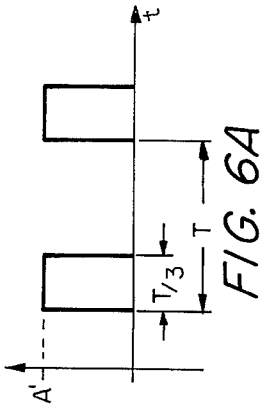
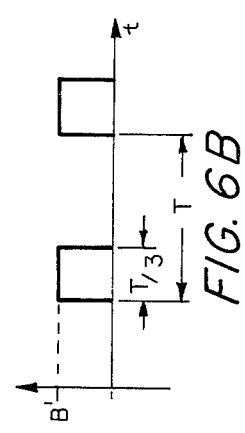
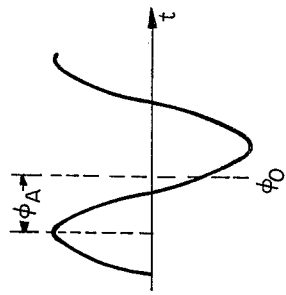
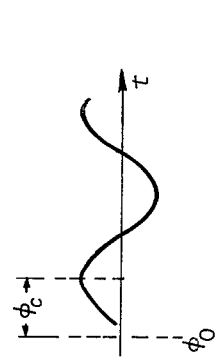

p-i-n DIODES
91a, 92a p-i-n DIODES
91b, 92b p-i-n DIODES
91c, 92c

RADIO FREQUENCY SIGNAL DIRECTION FINDING SYSTEM

BACKGROUND OF THE INVENTION

This invention relates generally to radio frequency signal direction finding apparatus and more particularly to receivers used in such apparatus for detecting radio frequency signals using multibeam radio frequency array antennas.

As is known in the art, it is often desirable to determine the direction of a source of radio frequency signals. One techique used to determine such direction is through the use of a multibeam array antenna. As is known, such array antenna may be designed so that it produces a plurality of simultaneously existing beams of radio frequency energy, each one of such beams having the gain and bandwidth of the entire antenna aperture. One such multibeam array antenna is described in U.S. Pat. No. 3,761,936 issued Sept. 25, 1975, "Multi-Beam Array Antenna", inventors Donald H. Archer, Robert J. Prickett and Curtis P. Hartwig, assigned to the same assignee as the present invention. Such antenna includes an array of antenna elements, coupled to a microwave lens through constrained electrical paths. A desired number of simultaneous beams may be obtained, the constrained electrical paths and the microwave lens equalizing the time delay of received energy between a given one of a number of feed ports and all points on a corresponding planar wavefront of the received energy. However, because the beam associated with each one of the feed ports has finite width, the beams associated with adjacent feed ports overlap one another. Consequently, received radio frequency energy propagating along a particular wavefront appears not just at a single feed port but portions of such received energy appear at adjacent feed ports, the relative level of the signals received at the feed ports being related to the direction of the source of the radio frequency energy relative to the array antenna. Further, because any practical array antenna of the type described has a finite number of feed ports, each corresponding to a corresponding discrete angular direction, receive radio frequency energy may often be received along a direction between two adjacent ones of the discrete angular directions and therefore an interpolation process is needed to determine the direction of the received energy to an accuracy, or resolution, greater than the resolution provided by a finite number of feed ports.

One technique used to determine radio frequency energy source direction using a multibeam array antenna of the type described has been to pass the energy received at each of the feed ports through separate receiver channels, heterodyne the received radio frequency signals to a suitable video frequency signal, convert the level to such converted signals to digital numbers and digitally compute the angle or direction of the source by comparing the relative levels of the received signals. While such technique is adequate in some applications, in other applications as where it is necessary to compare signal levels having differences of a few db and signal level variations in the order of 40 db, maintaining the separate channels "matched" over such 40 db dynamic range is an extremely difficult process requiring sophisticated, costly equipment.

A second technique used is a time multiplexing arrangement. Here each feed port is sampled, fed through a single receiver channel, heterodyned to a video frequency and demultiplexed into separate signals, each representing the signal level at a corresponding one of the feed ports. The "interpolation" is made by comparing the relative amplitudes of the separate signals. Again, when the relative levels of the received signals may be as small as a few db an where the absolute value of the level of a received signal may vary over 40 db, such arrangement requires that the time multiplex switching means have extremely low noise characteristics and extremely accurate switching characteristics thereby requiring sophisticated, costly apparatus.

SUMMARY OF THE INVENTION

With this background of the invention in mind it is an object of this invention to provide an improved radio frequency signal directon finding apparatus.

It is another object of this invention to provide improved direction finding apparatus which uses a multibeam array antenna.

It is another object of this invention to provide an improved multibeam array antenna direction finding system adapted to determine the direction of the source of a radio frequency signal to an accuracy greater than the number of beams produced by the antenna and where the received signal has a relatively large dynamic range.

These and other objects of the invention are attained generally by providing apparatus for determining the relative direction of a source of radio frequency signals, comprising: A multibeam array antenna adapted to receive radio frequency signals from such source and direct such received energy to feed ports of such antenna, the level of the directed energy being related to the direction of the source relative to the array antenna; means, including a sampling reference signal source, for sampling the radio frequency signals directed to the feed ports, at a frequency $f_s$, coupling such sampled signals to a single receiver channel and producing a composite signal having a frequency related to the frequency $f_s$ and a phase angle $\theta$, relative to the phase angle of the reference signal, the relative levels of the signals received at the feed ports being related to the phase angle $\theta$; and means responsive to the reference signal and the composite signal for producing an output signal related to the phase angle $\theta$ to provide an indication of the direction of the radio frequency energy source relative to the array antenna.

BRIEF DESCRIPTION OF THE DRAWINGS

FIG. 1 is a block diagram of a radio frequency energy source direction finding system according to the invention;

FIG. 2 is a graph showing antenna patterns associated with a multibeam array antenna included in the direction finding system of FIG. 1;

FIG. 3 is a phasor diagram useful in understanding the operation of the direction finding system of FIG. 1;

FIGS. 5a, 5b are curves useful in understanding the operation of the system of FIG. 1;

FIGS. 6a–6c are curves useful in understanding the operation of the system of FIG. 1;

FIGS. 7a–7c are curves useful in understanding the operation of the system of FIG. 1;

FIG. 8 is a curve useful in understanding the operation of the system of FIG. 1.

DESCRIPTION OF THE PREFERRED EMBODIMENT

Figure 4:
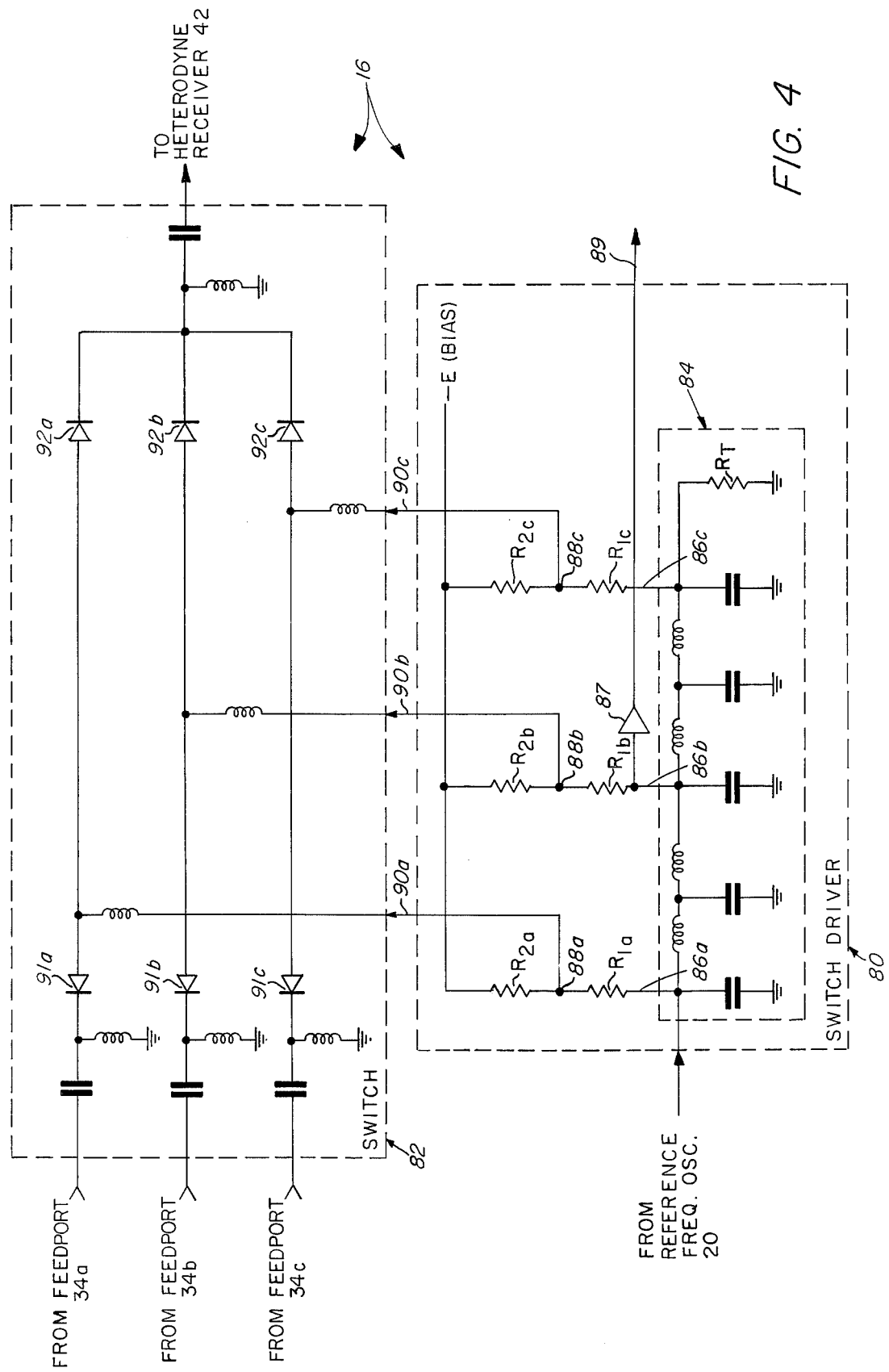
FIG. 4 is a schematic diagram of a switching means used in the direction finding system of FIG. 1.

Referring now to FIG. 1, a radio frequency energy source direction finding system 10 is shown to include a multibeam array antenna 12, a switching means 16, the details of which will be described in connection with FIG. 4, a receiver channel 18, a reference frequency generator 20, a phase detector 22, an angle of arrival computer 24 and a conventional display 26, arranged as shown.

The multibeam array antenna 12 includes a linear array of antenna elements 28a–28n, a similar plurality of transmission lines 30a–30n, a parallel plate radio frequency lens 32 and a plurality of feed ports, here three feed ports 34a, 34b, 34c, disposed along an arc of best focus of the parallel plate lens 32. One of such array antennae is described in U.S. Pat. No. 3,761,936, "Multi-Beam Array Antenna", issued Sept. 25, 1973, inventors Donald H. Archer, Robert J. Prickett and Curtis P. Hartwig, assigned to the same assignee as the present invention. As is known, the disposition of the antenna elements 28a–28n, the length of each one of the transmission lines 30a–30n and the configuration of the parallel plate lens 32 are selected so that the electrical length of the paths from any one of the feed ports 34a, 34b, 34c to points along a planar wavefront of radio frequency energy is any one of the three beams thereof are the same. That is, the length of the electrical path from feed port 34a to planar wavefront A is the same for radio frequency energy entering any one of the antenna elements 28a–28n; the length of the electrical path from feed port 34b to any point on planar wavefront B is the same; and the length of the electrical path from feedport 34c to any point on planar wavefront C is the same.

Considering first radio frequency energy in the beam represented by wavefront A it will be noted that portions of such energy fall successively on the antenna elements 28n–28a and that each one of such succeeding portions will be guided, through a different one of the transmission lines 30n–30a, to the parallel plate lens 32. The spacing between successive antenna elements 28a–28n, the lengths of the transmission lines 30a–30n, and the shape of the parallel plate lens 32 is such that each portion of the radio frequency energy in the beam represented by the wavefront A is "in phase" at feed port 34a while each portion of such energy arriving at feed ports 34b, 34c is "out of phase". That is, the vectorial addition of the "in phase" portions results in a maximum composite signal at feed port 34a and the vectorial addition of the "out of phase" portions results in composite signals at feed ports 34b, 34c which are substantially less, say in the order of 10 db down, than the maximum signal. Similarly, portions of the radio frequency energy in the beam represented by wavefront B, upon passing through antenna elements 28a–28n, transmission lines 30a–30n and the parallel plate lens 32 are "in phase" at feed port 34b and "out of phase" at feed ports 34a, 34c. Still similarly, portions of the radio frequency energy in the beam represented by the wavefront C are "in phase" at feed port 34c and "out of phase" at feed ports 34a, 34b. Typical cosine-like main lobe beam patterns associated with feed ports 34a, 34b, 34c are shown in FIG. 2. Here the boresight axis of the multibeam array antenna 12 is represented by the dotted line 40. The wavefront B is associated with a radio frequency source (not shown) which produces such wavefront B, such source being at an angle, here zero degrees from the boresight axis 40. Likewise, if the source (not shown) produces the wavefront C such source is disposed at an angle $-\theta_1°$ from boresight axis 40 and still likewise, if the source produces the wavefront A such source is disposed at an angle, here $+\theta_1$ from such boresight axis 40.

Radio frequency switching means 16, the details of which will be described in connection with FIG. 4, samples the radio frequency signals on ports 34a–34c and feeds such sampled signals to a conventional heterodyne receiver 42. Here the signals on ports 34a–34c are sampled sequentially, each for a period of time T/3. Each signal is sampled at a frequency 1/T. For example, if a radio frequency source (not shown) is disposed at an angle $\theta_a$ (FIG. 2), the sampled signals fed to heterodyne receiver 42 are as represented in FIG. 5a. Such sampled signals have levels A, B and C at ports 34a, 34b and 34c, respectively. The sampled radio frequency signals are heterodyned to suitable intermediate frequency signals and envelope detected by conventional detector 44. The envelope detected signals are represented in FIG. 5b, it being noted that the levels of the signals produced by the detector 44 have levels A′, B′, C′, such levels corresponding to the levels A, B and C, respectively, and are therefore related to the angular direction of the radio frequency source from the array antenna 12, i.e. related to the angle $\theta_a$.

In order to understand the operation of the direction finding system 10 it may be helpful to apply principles of superposition and consider the signal produced by the detector 44 as three separate signals as represented in FIGS. 6a–6c. As is known from Fourier analysis, a periodic waveform, such as each one of the waveforms in FIGS. 6a–6b, includes a series of sinusoidal signals, such sinusoidal signals having a fundamental frequency and suitably weighted higher harmonic frequencies. The frequency of the fundamental frequency is related to the period of the waveform, here such frequency being 1/T. Consequently, the fundamental sinusoidal frequency signal associated with the waveform shown in FIG. 6a, i.e. the waveform associated with the energy received at feed port 34a, may be represented as:

$$\vec{A} = A \cos[(2\pi t/T) + \phi_A] \quad \text{(Eq. 1)}$$

where $\phi_A$ is the phase angle of the sinusoidal signal relative to a reference phase $\phi_o$ as shown in FIG. 7a. Likewise, the fundamental frequency associated with the waveforms shown in FIGS. 6b and 6c and hence the energy received at feed ports 34b, 34c, respectively, may be represented as:

$$\vec{B} = B \cos[(2\pi t/T) + \phi_B]; \text{ and} \quad \text{(Eq. 2)}$$

$$\vec{C} = C \cos[(2\pi t/T) + \phi_C]; \text{ respectively,} \quad \text{(Eq. 3)}$$

where $\phi_B$ and $\phi_C$ are the phase angles of such signals relative to the reference phase $\phi_o$ as shown in FIGS. 7b and 7c, respectively. A reference signal is produced by the switching means 16. Such reference signal is, as shown in FIG. 8, a sinusoidal signal having a frequency 1/T and a reference phase angle $\phi_o$. As will be described in connection with FIG. 4, the sinusoidal reference signal produced by the switching means 16 is, here, in phase with the fundamental frequency signal component of the signal sampled at feed port 34b. Further, as will be discussed, the reference signal is here +120° out-of-phase with the fundamental frequency signal component of the signal sampled at feed port 34a when substantially all of the received energy is focused to feed port 34a and −120° out-of-phase with the fundamental frequency signal component of the signal sampled at feed port 34c when substantially all of the received energy is focused to feed port 34c. Therefore, referring to Equations 1, 2 and 3, here the phase angles $\phi_A$, $\phi_B$ and $\phi_C$ are +120°, 0° and −120°, respectively.

Referring now to FIG. 3, a vector diagram shows rotating vectors or phasors $\vec{A}$, $\vec{B}$ and $\vec{C}$, such phasors representing the waveforms shown in FIGS. 7a, 7b, 7c, respectively. The signal produced at the output of detector 44 (FIG. 1) is fed to a bandpass filter 46 tuned to the fundamental frequency 1/T. Therefore, the signals produced by such filter may be considered as a composite signal made up of phasors $\vec{A}$, $\vec{B}$ and $\vec{C}$. That is, the composite signal produced at the output of bandpass filter 46 is the vectorial sum of the three constituent signals, i.e. phasors $\vec{A}$, $\vec{B}$ and $\vec{C}$, that is the composite signal at the output of bandpass filter 46 may be represented as $$\vec{R} = \vec{A} + \vec{B} + \vec{C} \qquad \text{(Eq. 4)}$$

The phasor $\vec{R}$ is shown in FIG. 3. As noted above, the reference phase of the reference signal (FIG. 8) is in phase with the phasor $\vec{B}$ (FIG. 7b) and therefore the phase angle of the composite signal produced at the output of bandpass filter 46 (FIG. 1), $\alpha_T$, is related to the phase angle of the reference signal produced by the reference frequency generator 20. It is also noted that such angle $\alpha_T$ is related to the relative levels of the signals received by feed ports 34a, 34b, 34c, respectively. That is, a composite signal represented by the phasor $\vec{R}$ produced at the output of bandpass filter 46 has a phase angle, $\alpha_T$, relative to the phase angle of the reference signal produced by the reference frequency generator 20, such phase angle $\alpha_T$ being related to the relative levels of the signals received at feed ports 34a, and 34b and 34c. Therefore, the angular direction of a source of the radio frequency energy relative to the boresight axis 40 of the array antenna 12 may be determined by measuring the angle $\alpha_T$, that is by measuring the phase angle between a signal representative of the phasor $\vec{R}$ and the reference signal. For example, considering first a wavefront received along the boresight axis 40 (FIG. 2) it is noted that the energy at feedports 34a, 34c are, here, ∼10 db down from the energy out of feedport 34b. Therefore, referring to FIG. 3 the phasor $\vec{B}$ is larger than the combination of the phasors $\vec{A}$, $\vec{C}$ and the phasor $\vec{R}$ lies along the phasor $\vec{B}$, that is $\alpha_T = 0$. As the wavefront shifts to angle $\theta_b$ (FIG. 2) it is noted that the energy at feedports 34b, 34c decreases while the energy at feedport 34a increases and hence, referring to FIG. 3, phasors $\vec{B}$ and $\vec{C}$ decrease and phasor $\vec{A}$ increases, thereby increasing $\alpha_T$. When the wavefront is at angle $\theta_c$ (FIG. 2) the phasors $\vec{A}$, $\vec{B}$ are equal and hence $\alpha_T = +60°$ in FIG. 3, i.e. at an angle greater than the angle when the wavefront is at angle $\theta_b$. As the wavefront is received at increasing positive angles it is evident that $\alpha_T$ increases to +120° as when substantially all the received energy is focused to feedport 34a. A similar situation exists as the wavefront moves from boresight axis 40 to negative angles, $\theta$, that is the phasor $\vec{C}$ increases and the phasors $\vec{A}$, $\vec{B}$ decrease until substantially all the received energy is focused at feedport 34c, i.e. the phasor $\vec{R}$ is along the phasor $\vec{C}$ and $\alpha_T$ goes from 0° to −120°.

It is noted that the angle $\alpha_T$ is not related to the magnitude, R, of the phasor $\vec{R}$ and therefore passing the composite signal through a limiter and bandpass filter 48 (tuned to the fundamental frequency 1/T) normalizes the signal at the output of receiver channel 18, that is, such limiter may be considered as converting the phasor $\vec{R}$ to a unit phasor. The use of the limiter and bandpass filter 48 enables the radio frequency direction finding system to operate with received signals having levels which vary over an extremely wide dynamic range, e.g. greater than 40 db, while producing a sinusoidal signal of frequency 1/T and a phase angle $\alpha_T$ relative to the reference phase angle $\phi_o$ of the reference signal produced by the switching means 16.

The signal produced at the output of receiver channel 18 is a signal which represents the phasor $\vec{R}$ and may be represented as cos $[2_T{}^\pi t + \alpha_T]$. The reference signal produced by the switching means 16 may be represented as cos $(2_T{}^\pi) t$, FIG. 8. The ouput of receiver channel 18 and the reference signal is fed to a quadrature phase detector 22. The phase detector 22 is of conventional design and includes a pair of mixers 50, 52 and a phase shifter 55 arranged as shown to produce at the outputs of mixers 50, 52, signals which, after being passed through low pass filters 54, 56 (to filter signals having harmonics of the fundamental frequency, 1/T), may be represented as:

cos $\alpha_T$, sin $\alpha_T$, respectively.

The signals produced at the outputs of low pass filters 54, 56 are therefore related to the phase angle $\alpha_T$ (i.e. $\alpha_T = \tan^{-1}[\sin \alpha_T / \cos \alpha_T]$ and hence provide a measurement of the angular deviation $\theta$ of a source of radio frequency energy from the boresight axis of array antenna 12. Such signals are here converted into corresponding digital signals by conventional analog-to-digital converters 58, 60. The digital signals are fed to an angle of arrival computer 24. Such computer may be of any conventional design; here such computer includes a read only memory (i.e. table lookup) which converts a digital signal representative of $\alpha_T$ (i.e. $\tan^{-1}[\sin \alpha_T / \cos \alpha_T]$) into a digital word representative of the angular deviation $\theta$ of the radio frequency source from the boresight axis 40. That is, the read only memory of computer 24 converts the "electrical" angle $\alpha_T$ to the "mechanical" angle $\theta$.

Referring now to FIGS. 1 and 4, switching means 16 is shown to include a switch driver 80 fed by the reference frequency generator 20 together with an electronic switch 82 fed by the switch driver 80. As shown in FIG. 4, the switch driver 80 includes a four section delay line 84, here designed in a conventional manner, to provide sixty degrees of phase shift per section at the switching frequency $f_S = 1/T$. Three signals are coupled from the delay line 84 via lines 86a, 86b and 86c. The signal on line 86a may be represented as cos $(2\pi t/T = 2\pi/3)$, the signal on line 86b may be represented as cos $(2\pi t/T)$ and the signal on line 86c may be represented as cos $(2\pi t/T − 2\pi/3)$. The signal on line 86b serves as the reference signal (FIG. 8) and is coupled to, inter alia, the phase detector 22 (FIG. 1) via a noninverting buffer amplifier 87 and line 89. Considering first the signal on line 86a, such signal is fed to output terminal 88a through resistor $R_{1a}$. A −E volt bias source is fed to output terminal 88a through a resistor $R_{2a}$, as shown. The resistors $R_{1a}$, $R_{2a}$, together with the terminating resistor $R_T$ of delay line 84, provide a predetermined DC bias voltage at output terminal 88a for reasons to be described. Suffice it to say here that predetermined DC bias voltages are produced at output terminals 88b, 88c by resistors $R_{1b}$, $R_{2b}$, $R_{1c}$, $R_{2c}$ and $R_T$. The signals produced at the output terminals 88a, 88b, 88c are fed to switch 82 via lines 90a, 90b, 90c, respectively.

Switch 82 couples the signals at feed ports 34a, 34b, 34c to the heterodyne receiver 42 (FIG. 1) selectively in response to the signals on lines 90a, 90b, L 90c. In particular, when the signal on line 90a forward biases p-i-n diodes 91a, 92a, received radio frequency energy at feed port 34a passes through p-i-n diodes 91a, 92a to heterodyne receiver 42 (FIG. 1). Likewise, when the signal on line 90b forward biases p-i-n diodes 91b, 92b, received radio frequency energy at feedport 34b passes through p-i-n diodes 91b, 92b to such receiver 42 and when the signal on line 90c forward biases p-i-n diodes 91c, 92c, received radio frequency energy at feedport 34c passes through p-i-n diodes 91c, 92c to receiver 42 (FIG. 1). As will be described, only one of the feedports 34a-34c is coupled to receiver 42 during the same period of time. The capacitors shown in switch 82 are to provide a low impedance to the received signal and a high impedance to the switch driver 80. The inductors provide continuity (low impedance) for the switch driver and high impedance to received signals.

Figure 9A:
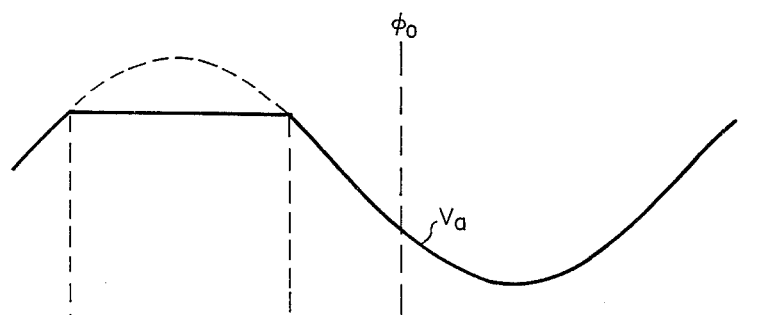
FIGS. 9a–9f are curves useful in understanding the operation of the system of FIG. 1.
Figure 9B:
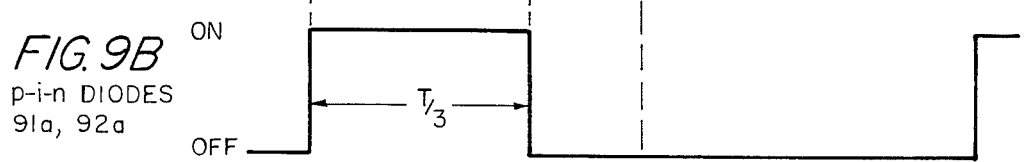
Figure 9C:
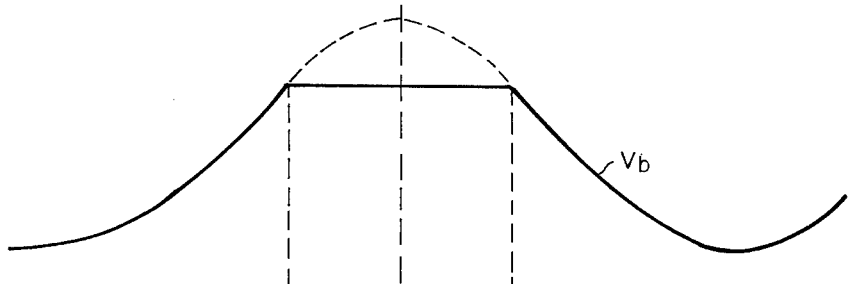
Figure 9D:
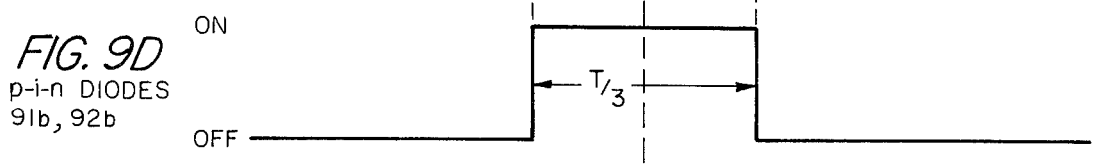
Figure 9E:
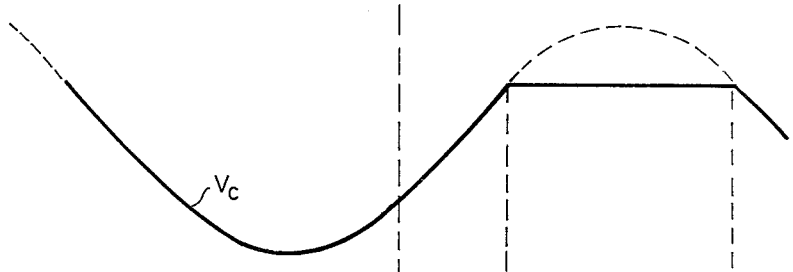
Figure 9F:
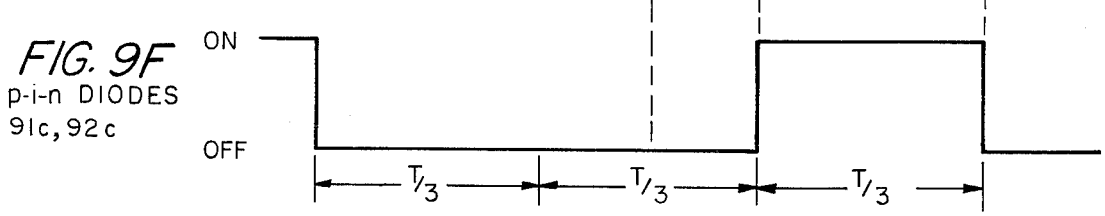

FIGS. 9a, 9c, 9e show the signals $V_a$, $V_b$, $V_c$ produced at output terminals 88a, 88b, 88c (FIG. 4). As noted above, such signals may be represented as: $\cos(2\pi t/T = 2\pi/3)$; $\cos 2\pi t/T$; and $\cos(2\pi t/T - 22\pi/3)$, respectively. FIGS. 9b, 9d and 9f show the "on" — "off" operation of the pairs of p-i-n diodes 91a, 92a; 91b, 92b; and 91c, 92c, respectively, in response to the signals $V_a$, $V_b$ and $V_c$, respectively. The resistors $R_{1a}$, $R_{2a}$, $R_{1b}$, $R_{2b}$, $R_{1c}$, $R_{2c}$ (FIG. 4) are selected to provide proper DC biasing to signals $V_a$, $V_b$, $V_c$ to enable each one of the pairs of p-i-n diodes to be forward biased (turned "on") during a different third of the switching period T (first pair 91a, 92a, then pair 91b, 92b and then pair 91c, 92c). It is noted that the pair of p-i-n diodes 91b, 92b are forward biased when the phase angle of the reference signal on line 89 is $\phi_o \pm \pi/3$. Therefore, considering a wavefront received along the boresight axis 40 (FIGS. 1, 2) substantially all of the received energy is focused to feed port 34b (FIG. 1) and is periodically fed to heterodyne receiver 42 (FIG. 1) during the "on" time of p-i-n diodes 91b, 92b. Therefore, the fundamental frequency signal component of such periodically fed signal is fed to mixers 50, 52 (FIG. 1) and is in phase with the reference signal (FIG. 8) produced on line 89 (FIG. 1). Therefore, under such condition ($\phi_B = 0°$) the signal produced at the output of receiver channel 18 may be represented as $\cos 2\pi t/T$ where $\alpha_T = 0$ (see Equation 2). As the wavefront shifts towards angular deviation $\theta_1$ (FIG. 2) the phase angle $\alpha_T$ (FIG. 3) correspondingly increases as described above, that is the phase angle of the signal produced at the output of receiver channel 18 (FIG. 1) relative to the reference phase angle $\theta_o$ of the reference signal produced on line 89 correspondingly increases. This relative phase angle is detected in phase detector 22 (FIG. 1) as described above. It follows then that the reference signal is −120° out-of-phase with the fundamental frequency signal component of the signal sampled at feed port 34a when substantially all of the received energy is focused to feed port 34a and is +120° out-of-phase with the fundamental frequency signal component of the signal sampled at feed port 34c when substantially all of the received energy is focused to feed port 34c.

Having described a preferred embodiment of this invention, it is now evident that other embodiments incorporating these concepts may be used. It is felt, therefore, that this invention should not be restricted to the disclosed embodiment, but rather should be limited only by the spirit and scope of the appended claims.

What is claimed is:

1. Apparatus for determining the direction of a source of radio frequency signals comprising:
   (a) an array antenna adapted to receive radio frequency signals from such source and direct such received signals to feed ports of such antenna, the level of the signals being related to the direction of the source relative to the array antenna;
   (b) means, including a sampling reference signal source, for sampling the radio frequency signals directed to the feed ports in response to such sampling signal, such signals being sampled at a sampling frequency, $f_s$;
   (c) bandpass filter means, tuned to the sampling frequency $f_s$ and fed by the sampled signals, for producing a composite signal having a frequency component, $f_s$, and a phase angle, $\theta$, relative to the phase angle of the reference signal, the relative levels of the received signals being related to the phase angle, $\theta$;
   (d) limiter means, coupled to the output of the bandpass filter means, for normalizing the level of the composite signal to a predetermined level invariant with variations in the level of the signals from the source producing a normalized composite signal having the phase angle $\theta$ and a frequency $f_s$; and
   (e) means, responsive to the reference signal and the normalized composite signal for producing an output signal related to the phase angle $\theta$ to provide an indication of the direction of the radio frequency energy source relative to the array antenna.

2. The apparatus recited in claim 1 wherein the array antenna is a multibeam array antenna.

3. The apparatus recited in claim 1 wherein the producing means includes a phase detector, responsive to the output signal and the reference signal, for determining the phase difference between such signals.

4. Apparatus for determining the direction of a source of radio frequency signals, comprising:
   (a) a multibeam array antenna for receiving radio frequency signals from such source and directing such received signals to feed ports of such antenna, the relative levels of such signals fed to such feed ports being related to the direction of the source relative to the array antenna;
   (b) a reference signal source for producing a reference signal having a frequency $f_s$;
   (c) switching means, responsive to the reference signal, for sequentially sampling the signals at the feed ports and for coupling such sampled signals to an output terminal;
   (d) bandpass filter means, coupled to the output terminal and tuned to the frequency $f_s$, for producing a composite signal having a frequency $f_s$ and a phase angle $\theta$, relative to a reference phase angle of the reference signal, such phase angle being related to the relative levels of the signals at the feed ports;
   (e) limiter means, fed by the composite signal for normalizing the level of the composite signal to a predetermined level invariant with variations in the level of the radio frequency signals producing a normalized composite signal having the frequency $f_s$ and the phase angle $\theta$; and
   (f) means, responsible to the normalized composite signal and the reference signal, for detecting the phase angle $\theta$ to provide an indication of the direction of the radio frequency signal source.

* * * * *

UNITED STATES PATENT OFFICE
CERTIFICATE OF CORRECTION

Patent No. 4,107,692  Dated August 15, 1978

Inventor(s) Robert Stewart Hutcheon and Bruce E. Gordon

It is certified that error appears in the above-identified patent and that said Letters Patent are hereby corrected as shown below:

Column 1, line 43, delete "receive" and replace with -- received --

Column 6, line 15, delete "$\cos [2_T^\pi t + \alpha_T]$" and replace with --$\cos (2\frac{\pi}{T} t + \alpha_T)$-- line 17, delete "$\cos (2_T^\pi) t$" and replace with --$\cos 2\frac{\pi}{T} t$--

Signed and Sealed this

*Fifteenth* Day of *April 1980*

[SEAL]

*Attest:*

SIDNEY A. DIAMOND

*Attesting Officer*  *Commissioner of Patents and Trademarks*